United States Patent [19]
Huber et al.

[11] 3,858,381
[45] Jan. 7, 1975

[54] ENVELOPE STUFFING APPARATUS

[75] Inventors: Charles L. Huber, Marion; Thomas L. Stickney, Ogdensburg, both of N.Y.

[73] Assignee: Xerox Corporation, Stamford, Conn.

[22] Filed: July 18, 1973

[21] Appl. No.: 380,481

[52] U.S. Cl.................. 53/188, 53/242, 53/251, 53/385
[51] Int. Cl..... B65b 5/04, B65b 43/16, B65b 43/36
[58] Field of Search .......... 53/29, 35, 37, 186, 187, 53/188, 242, 243, 251, 266, 384, 385

[56] References Cited
UNITED STATES PATENTS

| | | | |
|---|---|---|---|
| 2,746,221 | 5/1956 | Rouan et al. ................. | 53/266 X |
| 3,105,337 | 10/1963 | Clanin et al. .................. | 53/251 |
| 3,410,053 | 11/1968 | Bonsch ......................... | 53/266 |
| 3,423,900 | 1/1969 | Orsinger ....................... | 53/266 X |
| 3,698,151 | 10/1972 | Arneson........................ | 53/242 X |

Primary Examiner—Robert L. Spruill

[57] ABSTRACT

A method of, and apparatus for, inserting material into an enveloping container therefore are disclosed in accordance with the teachings of the present invention. Successive enveloping containers are continuously transported at a determined rate of speed along a first rectilinear transport path. Insert material is continuously transported along a second rectilinear transport path in fixed synchronism with the determined rate of speed of the transported enveloping containers, the first and second transport paths defining an angle therebetween and establishing an inserting zone. The continuously transported enveloping containers are predisposed to receive the insert material. The insert material is guided along said rectilinear path into said inserting zone by fixed guide means; said fixed guide means urging each insert into a corresponding enveloping container as said enveloping containers and insert material are transported into and through the inserting zone.

8 Claims, 7 Drawing Figures

ENVELOPE STUFFING APPARATUS

This invention relates to envelope stuffing techniques and, more particularly, to a method of and apparatus for continuously and rapidly inserting material into successive enveloping containers.

BACKGROUND OF THE INVENTION

Envelope stuffing machines for automatically inserting insert material into successively transported envelopes have long been known by the prior art. Many of these machines have utilized a reciprocating motion to transport an envelope from an envelope supply to a stuffing station and to transport insert material from an insert supply to said envelope disposed at said stuffing station. It has been found that the necessary mechanisms required to effect such reciprocating operation are characterized by shock and vibration caused by such reciprocating movement and excessive wear on the mechanical components. More significantly, this technique suffers from numerous start and stop operations resulting in a relatively low operating speed. Typically, in those machines employing the reciprocating operation wherein an envelope must await the reception of insert material, the maximum operating rate that has yet been achieved is less than ten thousand envelopes per hour.

In an attempt to improve upon the results obtained by prior art envelope stuffing machines, it has been proposed that both the envelope and insert therefor by synchronously transported to a stuffing station. Consistent with this proposal, an automatic envelope insertion machine has been designed wherein envelopes are sequentially transported to the stuffing station from an envelope supply whereat they await the arrival of a corresponding insert. Such machine is described in U.S. Pat. No. 3,410,053. Although the reciprocating motion has been eliminated, the envelopes and inserts are transported along transverse paths thereby requiring an envelope arriving at the stuffing station to await the reception of an insert. Successful operation of the patented machine requires that the inserting operation be executed while envelope movement is constrained. Thus, the time during which envelope motion is arrested to effect an inserting operation cannot be usefully employed to perform other operations, such as a transport operation, on that envelope. Consequently, minimal improvement is obtained in the total time required to process an envelope and its corresponding insert, thereby precluding a significant increase in the aforedescribed operating speed of ten thousand envelopes per hour.

A further suggestion to improve the operating speed of envelope stuffing apparatus contemplates the use of a rotating member provided with a series of uniformly spaced and radially extending compartments which are adapted to be sequentially advanced past operating stations. An envelope is deposited in a compartment at a first station, the rotating member is rotated and the envelope is adapted to receive an insert therefor at a second station, the insert is deposited into the envelope at a third station and the envelope is ultimately removed from its compartment at a subsequent station. Satisfactory operation of this apparatus has generally required that the rotating member be sequentially stepped from station to station and, therefore, the desirably rapid operating speed achieved by continuous motion is not obtained. On the contrary, the intermittent, or stepping, motion of the rotating member substantially limits the maximum operating speed that can be successfully obtained.

In an attempt to overcome the undesirable characteristics exhibited by prior art sequential stepping arrangements, an inserting machine has been designed which functions in a continuous flow manner. In the designed machine, a rotating drum is employed to transport successive envelopes from an envelope supply to an inserting station whereat material to be inserted is accelerated and forceably driven into the transported envelope. Although an improvement in operating speed has been obtained by this prior art machine, it has been found difficult to solve the problems attendant the synchronization of the rotating envelope drum and the insert accelerator. Furthermore, relatively complex and expensive components that are subject to a high instance of failure are required to practice this technique.

OBJECTS OF THE INVENTION

Therefore, it is an object of the present invention to provide a method of and apparatus for continuously inserting material into successively transported enveloping containers.

It is another object of the present invention to provide a method of and apparatus for inserting inserts into envelopes without requiring intermittent or reciprocating motion of the inserts or the envelopes.

A further object of the present invention is to provide a process for automatically inserting inserts into envelopes, together with the apparatus therefor, wherein successively spaced envelopes and successively spaced inserts are synchronously transported along respective converging coplanar transport paths into an inserting zone whereat each insert is uniformly and gradually inserted into a corresponding envelope.

A still further object of the instant invention is to provide a relatively simple method of inserting material into enveloping containers that may be facilely implemented by inexpensive apparatus wherein said material is transported in fixed synchronism with corresponding enveloping containers to a point of interception whereat said transported material is uniformly and gradually guided into corresponding enveloping containers.

Various other objects and advantages of the present invention will become clear from the following detailed description of an exemplary embodiment thereof, and the novel features will be particularly pointed out in connection with the appended claims.

SUMMARY OF THE INVENTION

In accordance with this invention, a method of inserting material into an enveloping container, and the apparatus therefor, is provided wherein successive enveloping containers are continuously transported at a determined rate of speed along a first rectilinear transport path to an inserting zone; insert material is continuously transported in fixed synchronism with said determined rate of speed along a second rectilinear transport path to said inserting zone whereat said insert material is uniformly inserted into a corresponding enveloping container; and said insert material is guided along said second rectilinear transport path in predetermined configuration and uniformly urged into a corresponding enveloping container at said insert zone as said enveloping containers and said insert material are transported along their respective rectilinear transport paths.

BRIEF DESCRIPTION OF THE DRAWINGS

The invention will be more clearly understood by reference to the following detailed description of exemplary embodiments thereof in conjunction with the accompanying drawings in which.

DETAILED DESCRIPTION OF THE INVENTION

Inserting Apparatus

Figures 1, 1A:
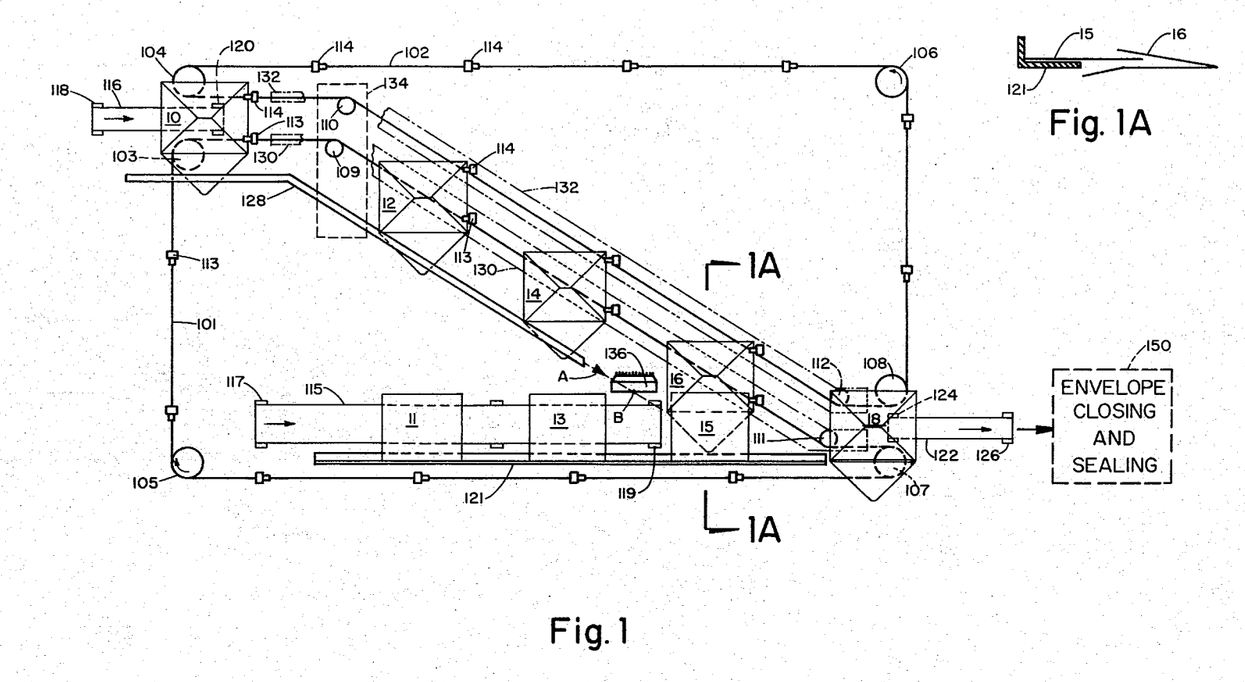
FIG. 1 is a schematic view of apparatus in accordance with the present invention.
FIG. 1A is a partial sectional view of a portion of FIG. 1.

Referring now to the drawings, wherein like reference numerals are used throughout, and in particular to FIG. 1, there is illustrated one embodiment of automatic inserting apparatus. For the purpose of the present description, it will be assumed that the automatic inserting apparatus described herein is particularly adapted for depositing insert material into enveloping containers. More particularly, the instant invention admits of particular utility in bulk mailing operations wherein informational material, such as promotional brochures, advertising circulars or the like, are prepared for mass distribution. Nevertheless, it should be readily understood that the automatic inserting apparatus may be advantageously employed to automatically insert material of any general type into a convenient enveloping container therefor. The illustrated automatic inserting apparatus is comprised of envelope conveying means including conveyer belt means 101 and 102, insert conveying means including conveyer belt means 115, guide means 121, envelope flap deflector means 128 and pneumatic discharge means 136. Conveyer belt means 101 is deployed about roller means 103, 105, 107 and 109 and is disposed in endless belt configuration. Conveyer belt means 101 may be constructed of any suitable flexible material conventionally employed as a conveyer belt and, additionally, may comprise an endless chain, cable, or the like. One or more of roller means 103, 105, 107 and 109 is adapted to be driven in a first, or clockwise direction. Consequently, conveyer belt means 101 is capable of being transported in a corresponding direction, that is, from roller means 109 to roller means 107 to roller means 105 and to roller means 103. A plurality of gripping members 113 are mechanically coupled to conveyer belt means 101 and may be adapted to pivot about their respective couplings. The gripping members may comprise spring loaded clips normally biased to receive envelopes transported thereto and to be forced closed so as to retain a received envelope.

Conveyer belt means 102 may be substantially similar to conveyer belt means 101 and is deployed about roller means 104, 106, 108 and 110; at least one of which is adapted to be driven in a second, or counter-clockwise direction at the precise speed at which at least one of roller means 103, 105, 107 and 109 is driven. Thus, conveyer belt means 102 is capable of being transported in a corresponding direction, that is, from roller means 110 to roller means 108 to roller means 106 and to roller means 104. The conveyer belt means 102 is provided with a plurality of spaced gripping members 114 mechanically coupled thereto. Gripping members 114 are substantially similar to gripping members 113 and are so mounted on conveyer belt means 102 as to form associated pairs with corresponding ones of gripping members 113. It may be appreciated that each pair of gripping members thus formed by corresponding ones of gripping members 113 and 114 are particularly adapted to receive an envelope transported thereto and to maintain the received envelope at a given position on the moving conveyer belt means. As will soon become apparent, conveyer belt means 101 and 102 cooperate to thus form an envelope conveying mechanism.

As may be apparent from FIG. 1, roller means 103 and 104 and roller means 107 and 108 are spaced apart by equal amounts whereby conveyer belt means 101 and 102 are characterized by parallel runs. Additionally, roller means 109 and 111 are provided to appropriately direct conveyer belt means 101 along a desired course as said conveyer belt means travels from roller means 103 to roller means 107. Similarly, roller means 110 and 112 are provided to appropriately direct conveyer belt means 102 along a parallel course as said conveyer belt means travels from roller means 104 to roller means 108. Thus, a first rectilinear transport path is defined. This first rectilinear transport path is angularly disposed with respect to the receiving path that extends between roller means 103, 104 and roller means 109, 110. A similar angle is formed by the first rectilinear transport path and the discharge path extending between roller means 107, 108 and roller means 111, 112.

Guide rails 130 and 132 are secured to the frame (not shown) of the illustrated apparatus and overlie conveyer belt means 101 and 102, respectively, as said conveyer belt means traverse the defined first rectilinear transport path. The guide rails are juxtaposed in close proximity to their respective conveyer belt means and serve to prevent unwanted bounce and flutter of the transported envelopes. Moreover, guide rails 130 and 132 serve to overcome the normal spring biasing of the gripping members 113 and 114, respectively, as said gripping members are driven thereunder. Consequently, the guide rails tend to urge the gripping members to close about a received envelope to effectively clamp the received envelope therein. The configuration of the guide rails may exhibit substantial correspondence with the geometric configuration exhibited by the conveyer belt means 101, 102 as said conveyer belt means extend from roller means 103, 104 to roller means 107, 108. However, in an effort to simplify the drawings herein, guide rails 130 and 132 are depicted in broken lines and are only partially represented.

The conveyer means thus far described is adapted to receive envelopes supplied thereto from a suitable envelope supply, an exemplary envelope supply being described hereinbelow with respect to FIGS. 2A and 2B. Accordingly, transfer means are provided to transfer successive envelopes from the envelope supply to the receiving portion of the envelope conveying means.

The transfer means may include conveyer belt 116 deployed about rollers 118 and 120. Conveyer belt 116 may, if desired, comprise a pair of overlying conveyer belts sufficient to deliver an envelope to the envelope conveying menas. One or more of the rollers 118 and 120 are driven at a rate that exceeds the rate at which the roller means included in the envelope conveying means are driven. Consequently, the transfer means is capable of overdriving a transferred envelope to the envelope conveying means. Nevertheless, the movement of conveyer belt 116, albeit faster than the movement of conveyer belt means 101 and 102, is synchronized with said conveyer belt means.

Deflecting means 128 is adapted to deflect the closure flap of an envelope transferred from the envelope supply from a closed flap position to an opened flap position. Hence, deflecting means 128 is capable of exposing the entry portion of each envelope to thereby provide access to the interior of said envelope through the opening provided therein. The deflecting means 128, comprises a rail that is adjacent to and substantially parallel with the deployment of conveyer belt means 101 about roller means 103, 109, 111 and 107. Hence, rail 128 is parallel to the first rectilinear transport path and is disposed to override the closure flap of each transported envelope to thus maintain each closure flap in an opened position. Rail 128 may extend the entire length of the first rectilinear transport path but, in the interest of simplification, is only partially shown herein.

The insert conveying means is adapted to transport insert material and may comprise conveyer belt means 115 deployed about plural roller means including roller means 117 and 119. The conveyer belt means 115 is preferably an endless belt or belts and may be constructed of any suitable material adapted to frictionally engage the insert material transferred thereto. Additionally, one or more of roller means 117 and 119 is driven so as to advance the conveyer belt means in the direction indicated by the arrow. The transported conveyer belt means 115 thus defines a second rectilinear transport path. As may be readily observed, the first and second rectilinear transport paths are convergently disposed to define an angle therebetween to thus establish an inserting zone. As will soon become apparent, the established inserting zone is determined by the interception of a transported envelope with a corresponding insert. The geometry of FIG. 1 represents that a transported envelope initially intercepts a corresponding insert at point B.

Guide means 121 is positioned adjacent conveyer belt means 115 and is disposed in parallel relation thereto. The guide means is seen to extend into the inserting zone and is adapted to guide inserts into the inserting zone and, as will soon become apparent, to urge each insert into a corresponding envelope as the inserts and envelopes are transported into and through the inserting zone. The guide means may comprise a suitable guide rail, or the like, along which rides a longitudinal edge of each insert transported by conveyer belt means 115. The guid rail may additionally include a shoulder portion which aids to support the inserts as said inserts are transported as best seen in FIG. 1A.

Pneumatic discharge means 136 is positioned adjacent the first rectilinear transport path defined by the envelope conveying means and is proximate to the established inserting zone. The pneumatic discharge means is adapted to predispose each envelope that is successively transported to the inserting zone by distorting the configuration thereof prior to the interception of that envelope with a corresponding insert. The pneumatic discharge means may thus comprise any conventional device capable of directing a pulse of air, for example, to an envelope. Preferably, pneumatic discharge means 136 is activated in timed relation to the movement of envelopes along the first rectilinear transport path. It is readily apparent that the pneumatic distortion of a transported envelope is manifested in an inflated configuration exhibited thereby to thus enhance the reception by said envelope of a corresponding insert. Accordingly, a portion of pneumatic discharge means 136 may, if desired, extend into the established inserting zone.

Removal means comprised of conveyer belt 122 deployed about roller means 124 and 126 is provided to remove an envelope from the discharge portion of the envelope conveying means subsequent to the completion of an inserting operation. Conveyer belt 122 may be similar to aforedescribed conveyer belt 115, or, alternatively, may comprise a pair of overlying conveyer belts sufficient to remove a filled envelope and to direct such envelope to further apparatus. One or more of roller means 124 and 126 is driven in synchronism with the aforedescribed driven roller means to thus drive conveyer belt 122 in the direction indicated by the arrow. If desired, other conventional devices may be employed to remove a filled envelope from the illustrated automatic inserting apparatus once an inserting operation has been completed. The filled envelope may then be directed to conventional envelope closing and sealing means 150 whereat a sealing operation is performed.

The operation of the automatic inserting apparatus depicted in FIG. 1 will now be described. Successive envelopes, such as envelope 10, 12, 14..., are sequentially transferred by conveyer belt 116 from a suitable envelope supply, to be described hereinbelow, to the envelope conveying means comprised of conveyer belt means 101 and 102. It should be recognized that envelope 18 has previously been transferred in preceding relation to envelope 16 which has previously been transferred in preceding relation to envelope 14, and so on. Envelope 10 is here being transferred to the envelope conveying means from the envelope supply. Conveyer belt 116 is driven at a faster rate than conveyer belt means 101 and 102 such that envelope 10 is overdriven into the vicinity of the envelope conveying means. As will soon be described, envelope 10 is withdrawn from the envelope supply in timed relation with the movement of conveyer belt means 101 and 102 such that the overdriven envelope is transferred by conveyer belt 116 into registration with gripping members 113, 114 as the gripping members travel to a predetermined position. Furthermore, as envelope 10 is transferred by conveyer belt 116, rail 128 is effectively inserted between the closure flap and a side wall of the envelope and serves to deflect the closure flap of envelope 10 from the closed position thereof to an opened position. It is recognized that the closure flap of envelope 10 is now disposed beneath rail 128 whereby said closure flap is maintained in the opened position as envelope 10 is transported by conveyer belt means 101 and 102.

A portion of conveyer belt 116 extends into the vicinity between roller means 103 and 104 to permit the transferred envelope 10 to achieve proper registration with gripping members 113, 114. The gripping members travel at a slower rate than conveyer belt 116 and here provide an obstacle to the further movement of envelope 10 at the higher speed determined by conveyer belt 116. Consequently, a skidding effect is provided between envelope 10 and the conveyer belt 116. As gripping members 113, 114 receive the transferred envelope 10, the gripping members are displaced by conveyer belt means 101 and 102, respectively, to travel beneath rails 130 and 132. These rails serve to clamp the respective gripping members about envelope 10 to thereby maintain the envelope at a given relative position along the length of the envelope conveying means. As conveyer belt means 101 and 102 advance, the traveling gripping members 113, 114 transport the clamped envelope 10 accordingly. It is here recognized that gripping members 113, 114 serve to grip the transverse edge of envelope 10, which gripping members are removed from the opposite corners of the envelope for a reason soon to become apparent.

It is readily appreciated that the plurality of gripping members 113, 114, spaced along conveyer belt means 101 and 102, respectively, are effective to maintain the successively transported envelopes in predetermined spaced relation. As the gripping members 113, 114 pass about roller means 109, 110, the direction of transport of the gripping members is altered. The continued direction of transport of envelope 10 is thus seen to be oblique to the initial direction of transport along the receiving path. Nevertheless, the geometrical alignment of the transported envelope is preferably maintained in a predetermined configuration as depicted by envelope 12 such that the longitudinal edges of envelope 12 are parallel to the longitudinal edges of envelope 10 notwithstanding the angular disposition of the transport path to the receiving path. Consequently, a blocking member 134, here illustrated in broken lines, may optionally be provided to preserve the original alignment of envelope 10 as said envelope is transported past roller means 109, 110 to the position exemplified by envelope 12. As gripping members 113, 114 arrive at roller means 109, 110, the continued oblique direction of transport of said gripping means would tend to pivot envelope 10 about the roller means. However, blocking member 134 is provided with a wall that admits of intimate contact with a longitudinal edge of envelope 10 as the envelope is transported therepast to thereby restrain any pivoting motion of the envelope. Consequently, the transported envelope retains its predetermined alignment and gripping members 113, 114 are forced to pivot about their respective couplings to conveyer belt means 101 and 102.

The continued travel of gripping members 113, 114 effectively pulls the successive envelopes along the rectilinear transport path identified by the arrow A toward the inserting zone. As an envelope, such as envelope 14, approaches the inserting zone, pneumatic discharge means 136 is activated to direct a pulse of air toward the transported envelope. It is appreciated that the directed air pulse pneumatically distorts envelope 14 to exhibit an inflated configuration whereby subsequent reception of insert material is enhanced. Overriding guide rails 130, 132 prevent undesired bowing of the envelope in response to the air pulse, thereby assuring a desired inflated configuration thereof. Hence, the side walls of the envelope are sufficiently separated to define an entrance portion through which insert material may be deposited.

Concurrent with the transfer of successive envelopes from the envelope supply to the envelope conveying means, successive inserts, such as inserts 11, 13, 15 . . . , are sequentially transferred from at least one insert supply to the insert conveying means comprised of conveyer belt means 115. It should be clearly understood that as used herein, the term "insert" refers to one or more inserts that are to be deposited in a single envelope. The transfer of inserts is effected by transfer means, soon to be described, operable in synchronism with the envelope transfer means. Thus, an insert, or plurality of inserts, associated with a corresponding envelope is transferred to conveyer belt means 115 and is transported by the conveyer belt means in alignment with a corresponding envelope. Plural finger means, not shown, may be spaced along conveyer belt means 115 and movable therewith to assist in transporting the inserts in proper registration with corresponding envelopes. As illustrated in FIG. 1, insert 11 is transported along a second rectilinear transport path. A longitudinal edge of the transported insert 11 is guided by guide means 121 to thus preserve the proper alignment of the insert with corresponding envelope 12. Since the envelopes are transported to converge with corresponding inserts at the insert zone, it is understood that synchronism therebetween may be obtained if the envelope velocity component that is parallel to the insert velocity is also equal thereto. Consequently, as is apparent from the illustrated geometry of the insert apparatus, conveyer belt means 101 and 102 are driven at a rate that exceeds the rate at which conveyer belt means 115 is driven. Furthermore, the envelopes and inserts are preferably transported along coplanar rectilinear paths whereby the transported envelopes and inserts are disposed in a common plane. In the exemplary embodiment illustrated herein, such common plane may be the horizontal plane, for example.

It may be appreciated that as the lower left-hand corner of, for example, envelope 14, as viewed in FIG. 1, approaches point B, corresponding insert 13 is synchronously transported to point B to be disposed at the entrance portion of said envelope. More particularly, at point B the longitudinal edge of insert 13 remote from guide rail 121 is particularly aligned with the entrance portion, or opening, of envelope 14. Consequently, point B may be recognized as the point of interception between the converging envelope and insert transport paths. Moreover, point B defines the beginning of the inserting zone. Clearly, further movement of envelope 14 and insert 13 serves to drive the insert into its corresponding envelope. The aforenoted finger means may serve to further drive insert 13 into envelope 14. It is, of course, recalled that the inflated configuration of envelope 14 attributed to the pulse of air directed thereto by pneumatic discharge means 136 permits insert 13 to be facilely deposited into the envelope.

As an insert and envelope synchronously enter the inserting zone, it is appreciated that a portion of the insert is deposited into the envelope such that a transverse edge of the insert may be intimately contacted by the juncture defined by the envelope walls. Upon obtaining this contact, it is apparent that independent means need no longer be provided to transport the insert in synchronism with its corresponding envelope. More particularly, as insert 15 is uniformly urged into envelope 16 by guide rail 121 in the unique geometric configuration exhibited, it is manifest that insert 15 may now continue to be transported along its transport path by the driving force exerted thereon by envelope 16. Hence, conveyer belt means 115 is no longer needed to transport insert 15. Consequently, the conveyer belt means 115 merely extends into the interior portion of the inserting zone. Adequate support of insert 15 in the absence of conveyer belt means 115 is nevertheless obtained by guide rail 121 together with envelope 16 into which a portion of the insert has already been deposited as illustrated in FIG. 1A. The further movement of envelope 16 along the envelope transport path and the consequential further movement of insert 15 along the insert transport path serves to further enclose the insert within the envelope. Guide rail 121 prevents an opposite movement of the insert thus enabling insert 15 to be driven deeper into envelope 16. Thus, it is seen that the converging insert and envelope transport paths, together with guide rail 121, cooperate to uniformly urge insert 15 into its corresponding envelope 16.

When gripping members 113, 114 and, therefore, the leading edge of envelope 16, arrive at roller means 111, 112, it may be appreciated that insert 15 is completely deposited within envelope 16. Further urging of the insert into its corresponding envelope is, therefore, not necessary. As viewed in FIG. 1, the lower edge of insert 15 is now coincident with the entrance portion, or opening, of envelope 16. Therefore, guide rail 121 may here be terminated.

Roller means 111, 112 serve to alter the direction of transport of gripping members 113, 114. This change in direction attempts to pivot the filled envelope about roller means 111, 112 in a manner complementary to the aforedescribed attempt to pivot the envelope about roller means 109, 110. That is, the filled envelope is now to be transported along the discharge path. However, the contact between guide rail 121 and the filled envelope prevents any rotational movement by that envelope; and, consequently, gripping members 113, 114 pivot about their respective couplings. The continued travel of conveyer belt means 101, 102 now transports the filled envelope, such as envelope 18, along the discharge path and coincidental to the insert transport direction. As is recognized, this direction of transport is oblique to the direction in which the envelopes had been transported intermediate roller means 109, 110 and roller means 111, 112 and parallel to the receiving path along which envelopes were initially transported. Envelope 18 is now transported to the removal means whereby the filled envelope may be transferred to further apparatus capable of executing further operations thereon. Guide rails 130, 132 terminate in the interspace between roller means 111, 112 and roller means 107, 108 to permit the previously clamped gripping members to release envelope 18, thereby expediting the efficacious removal of the filled envelope. Conveyer belt 122 of the removal means is driven in synchronism with conveyer belt means 101 and 102 to further transport envelope 18 subsequent to the release thereof by the gripping members. Accordingly, a portion of conveyer belt 122 extends between roller means 107, 108 to properly receive the released, filled envelope.

It is recalled that as an envelope convergingly approaches a corresponding insert, the closure flap of said envelope rides beneath rail 128. As an insert, such as insert 15, is deposited in an envelope, such as envelope 16, the closure flap of said envelope is directed beneath guide rail 121 to assume an underriding relation therewith. However, as the filled envelope, such as envelope 18, is transferred to conveyer belt 122, it is appreciated that the closure flap is no longer maintained in its open position. Consequently, conveyer belt 122 may transfer the filled envelope to conventional closing and sealing means 150 to now achieve sealing engagement between the closure flap and the body of the envelope. Additional operable components, not shown, may perform further operations on the filled envelope.

It is now appreciated that the movement of the successive envelopes is synchronized with the movement of successive inserts along converging transport paths. Furthermore, the operation of pneumatic discharge means 136 is likewise synchronized with the movement of envelopes and inserts. Although the foregoing description has suggested that a longitudinal edge of a transported insert is aligned with the entrance portion, or opening, of a correspondingly transported envelope, it is readily apparent that such alignment may, if desired, be varied. That is, the entrance portion of a transported envelope is maintained in opposite relation with the longitudinal edge of a corresponding insert if that component of envelope velocity that is parallel to the insert velocity is equal to said insert velocity. This assures substantially simultaneous arrival at the intercept point B of an envelope and a corresponding insert. If, however, envelope velocity along the envelope transport path is equal to the insert velocity along the insert transport path, then substantially simultaneous arrival at intercept point B may be achieved if an envelope is received by the envelope conveying means in advance of the reception of a corresponding insert by the insert conveying means such that said envelope exhibits a relatively leading relationship with respect to its corresponding insert. In accordance with this modification, insert 11 would be displaced to the left of envelope 12, for example, as viewed in FIG. 1, and insert 13 would likewise be displaced to the left of envelope 14, but by a smaller amount. Insert 15 and envelope 16 would, of course, admit of coincidental alignment.

Although the foregoing has described the transfer of envelope 10, for example, from an envelope supply to the envelope conveying means in a direction parallel to the transport direction of the inserts, it is appreciated that envelope 10 may be transferred to the envelope conveying means in any desired direction. For example, envelope 10 may be transferred in a direction orthogonal to the indicated transfer direction. Similarly, the direction in which envelope 18, for example, is removed from the envelope conveying means may be any convenient direction and is not necessarily limited to that indicated in FIG. 1. Likewise, the direction of transfer of successive inserts to conveyer belt means 115 need not necessarily be colinear with the direction in which the inserts are then transported by the insert conveying means.

ENVELOPE SUPPLY

Figure 2A:
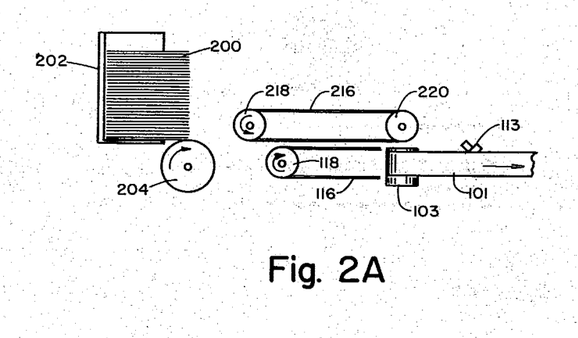
FIGS. 2A and 2B schematically illustrate the envelope receiving portion of the apparatus depicted in FIG. 1.
Figure 2B:
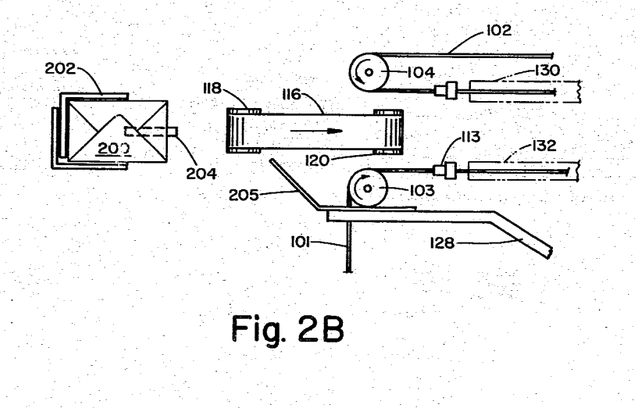

Referring now to FIGS. 2A and 2B, there is schematically illustrated side and top views, respectively, of an exemplary embodiment of envelope supply and transfer means. The illustrated envelope supply and transfer means is comprised of a suitable magazine 202, roller means 204 and conveyer belts 116 and 216. Magazine 202 is adapted to suitably support a plurality of envelopes 200 stored therein. The closure flap of each envelope is here illustrated as assuming its closed position. Preferably, the longitudinal dimension of the envelopes stacked in the magazine is greater than the base support member thereof such that the envelopes extend beyond the magazine 202.

Roller means 204 is disposed beneath magazine 202 and is adapted to be suitably operated whereby envelopes 200 are successively withdrawn thereby and directed to conveyer belts 116 and 216. Accordingly, roller means 204 may comprise a conventional pick-off device to frictionally engage the envelopes disposed in magazine 202. Alternatively, roller means 204 may comprise a conventional vacuum roller or other vacuum pick-off device employing suction pressure to withdraw successive envelopes from the magazine. Notwithstanding the particular embodiment of roller means 204, the operation thereof is synchronized with the movement of conveyer belt means 101 and 102 and with the movement of conveyer belt means 115. Consequently, roller means 204 is particularly adapted to execute a synchronized envelope withdrawal operation to withdraw successive envelopes from magazine 202 in timed relation with the operation of the inserting apparatus previously described hereinabove with respect to FIG. 1.

Conveyer belt 116 comprises a conventional conveyer belt or plural belts deployed about plural roller means including rollers 118 and 102, previously described. The conveyer belt cooperates with conveyer belt 216, the latter comprising a conventional conveyer belt or plural belts deployed about plural roller means including rollers 218 and 220, suitably driven, to transfer a withdrawn envelope from magazine 202 to the envelope conveying means. Conveyer belts 116 and 216 are disposed in overlying relationship and adapted for counter rotation to thus define a transfer path therebetween. As is appreciated, the movement of conveyer belts 116 and 216 is synchronized with the operation of roller means 204. It is recalled that conveyer belt 116, and therefore conveyer belt 216, is operated at a faster rate than conveyer belt means 101 and 102 to permit a transferred envelope to be overdriven into accurate registration with a pair of receptive gripping members 113, 114.

As may be recognized from FIG. 2B, guide rail 128 is provided with angulated finger 205 mounted upon a terminal portion thereof. Angulated finger 205 is particularly disposed to be inserted between the closure flap of a transported envelope and the envelope body to thereby deflect the closure flap from its normally closed position. The angulation of finger 205 serves to permit a uniform opening of the closure flap of a transferred envelope and to direct said closure flap beneath rail 128.

In operation, roller means 204 rotates in the direction indicated by the arrow at a velocity that is synchronized with the movement of conveyer belt means 101 and 102 to direct the first, or bottommost, envelope stored in magazine 202 to the transfer path defined by the overlying conveyer belts 116, 216. The conveyer belts are driven about their respective rollers at a rate that exceeds the rate at which the conveyer belt means 101 and 102 are driven. Additionally, roller means 204 and conveyer belts 116, 216 operate in timed relation to deliver an envelope from magazine 202 into registration with a pair gripping members 113, 114 when said gripping members substantially obtain the position indicated in FIG. 2 B. It is appreciated that the relatively high operating speed of conveyer belts 116, 216 tends to overdrive a transferred envelope to assure proper registration thereof with gripping members 113, 114.

As an envelope is transferred to gripping members 113, 114 of the envelope conveying means by conveyer belts 116, 216, the traversal of said envelope effects the insertion of angulated finger 205 between the normally closed closure flap and a side wall of the transferred envelope. As the transferred envelope continues to move toward the envelope conveying means, the configuration of angulated finger 205 forces the closure flap open and directs the opened closure flap beneath rail 128. Thus it is seen, the combination of angulated finger 205 mounted upon a terminal portion of rail 128 results in the deflection of the closure flap of a transferred envelope from a closed position to an opened position and, additionally, maintains the closure flap in the opened position as the envelope is subsequently transported by the envelope conveying means. As the next succeeding pair of gripping members 113, 114 is conveyed to the position indicated in FIG. 2 B, an immediately succeeding envelope is withdrawn from magazine 202 by roller means 204 and transferred into proper registration with said gripping members by conveyer belts 116, 216.

Although FIGS. 2A and 2B, represent that the transfer path established between magazine 202 and the envelope conveying means is coplanar with the transport path established by conveyer belt means 101 and 102, it should be readily apparent that the transfer path may exhibit any convenient geometric relationship with respect to the transport path. Thus, for example, the transfer path may be angulated to extend above or below the receiving portion of the envelope conveying means such that a withdrawn envelope might be transferred along an inclined path.

Additionally, the dimensional parameters exhibited by the apparatus illustrated in FIGS. 2A and 2B should be adapted to accommodate diverse envelopes. For example, the opposite side walls of magazine 202 may be adjustable to receive envelopes of varying widths. Similarly, conveyer belts 116, 216 should be wide enough to provide adequate support for an envelope transferred thereby but need not be wider than the smallest envelope that is contemplated for use with the present invention. Also, the interspace between roller means 103 and 104 should be such that the gripping members 113, 114 securely maintain a transferred envelope in stable configuration as said envelope is transported. Likewise, rail 128 and angulated finger 205 should be sufficiently disposed to enable the deflection of the closure flap of a transferred envelope and for maintaining the deflected closure flap in an opened position as the envelope is subsequently transported to the inserting zone.

INSERT SUPPLY

Figure 3A:
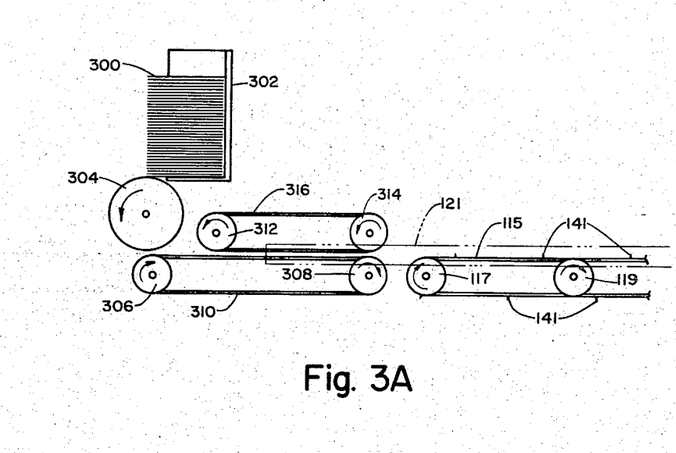
FIGS. 3A and 3B schematically illustrate the insert material receiving portion of the apparatus of FIG. 1.
Figure 3B:
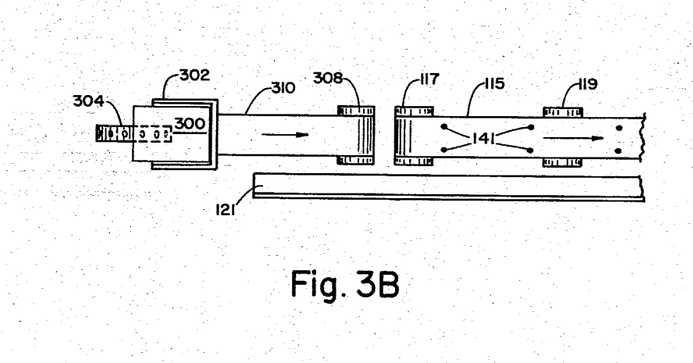

Apparatus similar to the aforedescribed envelope transfer apparatus is provided to transfer insert material from an insert supply to the insert conveying means. An exemplary embodiment of contemplated insert transfer apparatus is depicted in FIGS. 3A and 3B which represent side and top views thereof, respectively. The insert transfer apparatus is comprised of insert storage means 302, roller means 304 and conveyer belts 310, 316. Insert storage means 302 may comprise a conventional magazine, similar to aforedescribed magazine 202, within which a quantity of inserts 300 is stacked. Roller means 304 is disposed beneath magazine 302 and is adapted to withdraw successive inserts from the magazine and to direct each withdrawn insert to conveyer belts 310, 316. The roller means 304 is, therefore, rotatable about its axis of rotation in the direction indicated by the arrow. Roller means 304 may be similar to previously described roller means 204. In the preferred embodiment illustratively represented in FIGS. 3A and 3B, roller means 304 comprises a conventional vacuum roller device including a plurality of apertures disposed about the periphery thereof, which apertures function as vacuum nozzles to exert suction pressure on successive inserts to permit the sequential withdrawal of inserts from magazine 302 and to retain each withdrawn insert on roller means 304 under the influence of suction pressure.

Conveyer belt 310 comprises a conventional conveyer belt or plural belts and is deployed about plural roller means including rollers 306, 308 and is adapted to be conveyed in the direction indicated by the arrows. Conveyer belt 316 is deployed about plural roller means including rollers 312, 314 and is disposed in overlying relation with respect to conveyer belt 310. Conveyer belt 316 is adapted to be driven counter-rotatively to conveyer belt 310. The combination of conveyer belts 310 and 316 defines an insert transfer path. It is readily apparent that magazine 302, roller means 304, conveyer belt 310 and conveyer belt 316 may be substantially similar to aforedescribed magazine 202, roller means 204, conveyer belt 116 and conveyer belt 216, respectively.

FIGS. 3A and 3B further illustrate guide rail 121 juxtaposed adjacent the transfer path established by conveyer belts 310, 316. It is recalled that guide rail 121 serves to guide a transported insert along the insert transport path into the inserting zone whereat the transported insert is uniformly urged into a corresponding envelope. Thus, it is seen that a withdrawn insert, upon being received by conveyer belts 310, 316, is appropriately guided to the insert conveying means.

Roller means 304 together with conveyer belts 310, 316 operate in timed relation with the inserting apparatus illustrated in FIG. 1 to enable an insert to be transported into the insert zone simultaneously with the transporting of a corresponding envelope thereto. Thus, when an envelope attains a predetermined position in its travel from magazine 202 to the insert zone, roller means 304 withdraws the bottommost insert 300 from magazine 302 and delivers said withdrawn insert to conveyer belts 310, 316. Conveyer belts 310, 316 receive the insert from roller means 304 and transfer the received insert to conveyer belt means 115. It is recognized that guide rail 121 cooperates with conveyer belts 310, 316 to align the longitudinal edges of the transferred insert. Conveyer belt means 115 receives the transferred insert from conveyer belts 310, 316 and in cooperation with the aforenoted finger means, here designated by reference numeral 141, transports the received insert to the insert zone in synchronism and in registration with the transport of a corresponding envelope.

It is appreciated that, if desired, the transfer path established by conveyer belts 310, 316 need not be colinear with the transport path established by conveyer belt means 115. Accordingly, the transfer path may be angularly disposed above or below the transport path such that a transferred insert traverses an inclined path to the insert conveying means. Additionally, although only one magazine 302 is shown to store inserts 300 stacked therein, it is manifest that, if desired, a plurality of magazines may be provided in operable relation with the transfer path such that the total insert material to be deposited in a single envelope may be cumulative. Furthermore, plural magazines in combination with a like plurality of transfer conveyer belts may be disposed along the length of conveyer belt means 115 such that cumulative insert material may be deposited in each envelope.

If roller means 304 and/or roller means 204 comprises a conventional vacuum pick-off device, or the like, it is appreciated that a single pumping or blowing mechanism may be provided to create the necessary decreased air pressure at the roller means and to generate a pulse of air at pneumatic discharge means 136. One of ordinary skill in the art will recognize that the juxtaposition of magazine 202 with respect to conveyer belts 116, 216 may be substituted for the illustrated juxtaposition of magazine 302 with respect to conveyer belts 310, 316. Appropriate spacing between successive inserts as well as between successive envelopes may be readily achieved by providing conventional cam operation of roller means 304 and 204, respectively, to withdraw successive inserts and envelopes from magazines 302 and 202, respectively in a predetermined timed sequence. Hence, the synchronized operation of the insert withdrawal and transfer means and the envelope withdrawal and transfer means effects the transporting of successive envelopes by conveyer belt means 101, 102 and the transporting of successive inserts by conveyer belt means 115 in corresponding preestablished spaced relation.

FURTHER EMBODIMENT OF INSERTING APPARATUS

Figure 4:
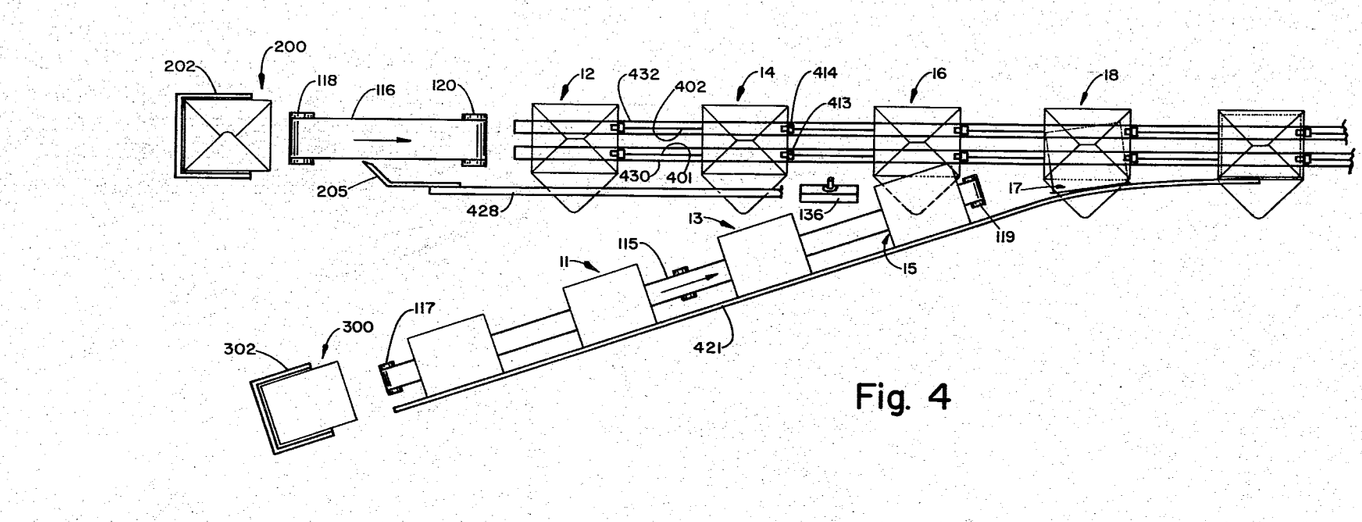
FIG. 4 is a schematic illustration of a further embodiment of the instant invention.

An alternative embodiment of automatic inserting apparatus that is consistent with the concepts of the present invention is illustrated in FIG. 4. Identical reference numerals are employed in FIG. 4 to identify elemental components that are substantially similar to those corresponding components previously described hereinabove. Accordingly, the alternative embodiment of novel automatic inserting apparatus comprises envelope conveying means including conveyer belt means 401, 402 and insert conveying means including conveyer belt means 115 and guide rail 421. Conveyer belt means 401 and 402 may be similar to aforedescribed conveyer belt means 101 and 102 and are disposed in parallel relation to define a rectilinear envelope transport path. A plurality of gripping members 413, 414 are mounted in spaced relation along the length of conveyer belt means 401 and 402 and are substantially similar to aforedescribed gripping members 113, 114. Conveyer belt means 401 and 402 are adapted to be driven at a constant velocity by suitable roller means, not shown. A pair of guide rails 430, 432 overlie conveyer belt means 401, 402, respectively, to perform substantially the same function as corresponding guide rails 130, 132 previously described with respect to FIG. 1. Rail 428, which may be similar to aforedescribed rail 128, is disposed adjacent the envelope conveying means and is parallel to the envelope transport path. Angulated finger 205 is mounted on a terminal portion of rail 428 to deflect the closure flap of a transferred envelope and to guide said deflected closure flap beneath rail 428.

As is recognized, conveyer belt means 115 of the insert conveying means is deployed about roller means including rollers 117 and 119, and establishes a rectilinear insert transport path. The envelope and insert transport paths define an angle therebetween and a point of interception. Furthermore, the envelope and insert conveying means are disposed to permit successive envelopes and inserts to be transported in a common plane towards said point of interception. Guide rail 421 is similar to aforedescribed guide rail 121 and is adapted to guide successive inserts toward the point of interception and to uniformly urge the inserts into corresponding envelopes thereat. As is apparent, the converging transport paths establish an inserting zone commencing at said point of interception.

In accordance with the alternative embodiment illustrated herein, successive envelopes are adapted to be transported along a continuous transport path. That is, the alteration in the course of the conveyer belt means previously provided by roller means 109, 110 and roller means 111, 112 is not here provided. Successive inserts are transported along a continuous insert transport path, and guide rail 421 is provided with an elbow at the terminating portion of the inserting zone to appropriately guide a deposited insert, whereby said deposited insert is properly positioned within its corresponding envelope.

The operation of the alternative inserting apparatus illustrated in FIG. 4 is substantially similar to the operation of that apparatus previously described with respect to FIG. 1. Successive envelopes 200 are withdrawn from magazine 202 and transferred by conveyer belt 116 to conveyer belt means 401, 402. It is recalled that conveyer belt 116 is driven at a rate that exceeds the rate at which conveyer belt means 401, 402 are driven, whereby each transferred envelope is driven into proper registration with a pair of gripping members 413, 414. Angulated finger 205 is inserted between the closure flap of a transferred envelope and the side wall thereof to deflect the closure flap and direct same beneath rail 428. Consequently, conveyer belt means 401, 402 and rail 428 cooperate to continuously transport successive envelopes in pre-established spaced relation and insert receiving configuration. It is appreciated that guide rails 430, 432 effectively clamp the spaced gripping members 413, 414 about each transferred envelope to thus maintain the envelopes in predetermined alignment as said envelopes are transported.

In synchronism with the withdrawal, transfer and subsequent transport of successively spaced envelopes, successive inserts are withdrawn from magazine 302, transferred to conveyer belt means 115 and transported by the conveyer belt means toward the inserting zone. Insert 11 is transported to the inserting zone in alignment with envelope 12. If the distance traversed by insert 11 from a reference point to the inserting zone is substantially equal to the distance traversed by corresponding envelope 12 from a similar reference point to the inserting zone, then conveyer belt means 115 may be driven at the same rate of speed as conveyer belt means 401, 402. It is here observed that although insert 11 and corresponding envelope 12 are properly aligned such that the entrance portion of the envelope is maintained in receiving relation with a longitudinal edge of the insert, the entrance portion of envelope 12 need not be parallel to a longitudinal edge of insert 11, as previously described. Accordingly, the longitudinal edges of insert 11, which are aligned by guide rail 421, and the entrance portion of envelope 12 exhibit an angular relationship that is substantially similar to the angle defined by the insert and envelope transport paths.

As noted hereinabove, plural magazines in combination with a like plurality of withdrawal means and transfer conveyer belts may be disposed along the length of conveyer belt means 115 such that cumulative material may be inserted into each envelope.

In accordance with the continuous transport thereof, corresponding envelopes and inserts converge upon the inserting zone. As an envelope, such as envelope 14, approaches the inserting zone, the envelope passes within the vicinity of pneumatic discharge means 136. As previously described, a pulse of air is generated by the pneumatic discharge means and directed toward the envelope to thus establish an inflated configuration therein, whereby reception of corresponding insert 13 is enhanced. Upon entering the inserting zone, each insert is uniformly urged into a corresponding envelope by guide rail 421. Hence, insert 15, for example, is uniformly and gradually deposited within corresponding envelope 16. Conveyer belt means 115 continues to transport insert 15 in synchronism with envelope 16 and guide rail 421 urges the insert deeper into the corresponding envelope.

When insert 15 is sufficiently deposited within envelope 16 such that the upper left corner of the insert, as viewed in FIG. 4, is in intimate contact with the juncture defined by the side walls of envelope 16, it is recognized that a driving force will now be exerted on the insert by envelope 16 as said envelope continues along its transport path. Consequently, conveyer belt means 115 is no longer required to transport insert 15. Therefore, roller 119 may be provided at this point to return conveyer belt means 115 to roller 117 and the conveyer belt means merely extends into the interior portion of the inserting zone. As envelope 16 now transports insert 15, guide rail 421 urges the insert deeper into the envelope. When the envelope, such as envelope 18, and insert, such as insert 17, are transported past the elbow provided in guide rail 421, it is recognized that the position of the insert is adjusted so that the envelope is now properly filled. At this point, the entrance portion of envelope 18 is substantially coincident with guide rail 421. The filled envelope may now be removed to further apparatus such as conventional envelope closing and sealing means, in a manner similar to that described hereinabove with respect to FIG. 1.

It should be readily understood that the automatic inserting apparatus illustrated in FIG. 4 may be adapted to deposit inserts of various sizes into diverse envelopes. Accordingly, the dimensional parameters of the illustrated apparatus should be sufficient to accommodate such inserts and envelopes.

While the invention has been particularly shown and described with reference to exemplary embodiments thereof wherein insert material is deposited within conventional envelopes, it is manifest that various other enveloping containers may be employed to receive material of any convenient type. Additionally, it is apparent that the various conveying belts described hereinabove may comprise any conventional conveying device of endless loop configuration, or of web configuration, such as belt, chain, cable, or the like. For example, conveyer belt means 115 together with the various conveyer belts 116 and 310 may comprise conventional vacuum transport belts. Additionally, conveyer belts 216 and 316 may, if desired, be omitted. Furthermore, it is recognized that if conveyer belt means 101 and 102, as well as conveyer belt means 401 and 402, which have been described as comprising endless belts, alternately comprise endless chains or cables, the various roller means, such as roller means 103, 105, 107, 109, 111 and roller means 104, 106, 108, 110 and 112, may be disposed to have their respective axes of rotation parallel to the plane of the drawings instead of transverse thereto as illustratively depicted herein. Additionally, any suitable transfer mechanisms may be utilized to effect the transfer of successive envelopes from the envelope supply to the envelope conveying means and, similarly, to effect the transfer of successive inserts from the insert supply to the insert conveying means. Moreover, if enveloping containers are to be filled with insert material in accordance with the techniques of the present invention, rail 128 may be omitted if the enveloping containers are not provided with closure flaps similar to those described hereinabove. Furthermore, it is manifest that the common plane in which the successive envelopes and inserts are transported may comprise a horizontal plane, a vertical plane or any suitable planar configuration.

Therefore, it will now be obvious to those of ordinary skill in the art that the foregoing and various other changes and modifications in form and details may be made without departing from the spirit and scope of the invention. It is, therefore, intended that the appended claims be interpreted as including all such changes and modifications.

What is claimed is:

1. Apparatus for automatically inserting inserts into envelopes, comprising:
    an envelope supply, each envelope including an opening and a closure flap therefor;
    an insert supply;
    first conveying means for continuously transporting envelopes supplied thereto from said envelope supply along a first conveying path, including an envelope conveyer belt means having a plurality of gripping members mounted thereon in spaced relation;
    second conveying means for continuously transporting inserts supplied thereto from said insert supply along a second conveying path; said first and second conveying means defining an angle therebetween and establishing an inserting zone, and said envelopes and inserts being respectively transported in a common plane and in synchronous relation;
    means for adapting said transported envelopes to receive said inserts; and
    guide means adjacent said second conveying means and extending into said inserting zone for guiding said inserts to said inserting zone along said second conveying path and for urging said inserts into said envelopes as said envelopes are transported into and through said inserting zone by said first conveying means
    said envelope supply comprising: means for storing a stack of envelopes; means for withdrawing successive envelopes from said stack in timed relation with the movement of said envelope conveyer belt means; and transfer means for transferring each successively withdrawn envelope to said envelope conveyer belt means at a rate that exceeds the rate at which said envelope conveyer belt means transports said envelopes to thereby drive said transferred envelope into registration with selected ones of said gripping members.

2. Apparatus for automatically inserting inserts into envelopes in accordance with claim 1 wherein said means for adapting said transported envelopes to receive said inserts comprises pneumatic discharge means positioned adjacent said first conveying means and in the vicinity of said inserting zone.

3. Apparatus for automatically inserting inserts into envelopes in accordance with claim 1 wherein said gripping members are adapted to receive and maintain said envelopes in predetermined alignment as said envelopes are transported by said envelope conveyer belt means such that said opening of each transported envelope admits of a receiving relation with a corresponding transported insert at said inserting zone.

4. Apparatus for automatically inserting inserts into envelopes in accordance with claim 1 further including:
    deflecting means for deflecting the closure flap of a transferred envelope from a closed position to an opened position to thereby provide access to the interior of said envelope through the opening thereof; and
    means for maintaining said closure flap in said opened position as said envelope is transported by said envelope conveyer belt means.

5. Apparatus for automatically inserting inserts into envelopes in accordance with claim 4 wherein said means for maintaining said flap in said opened position comprises a rail parallel to said first conveying path and adjacent said envelope conveyer belt means for overriding the closure flap of each transported envelope.

6. Apparatus for automatically inserting inserts into envelopes in accordance with claim 1 wherein said second conveying means comprises insert conveyer belt means for frictionally engaging said inserts and for maintaining said inserts in alignment with corresponding envelopes.

7. Apparatus for automatically inserting inserts into envelopes in accordance with claim 6 wherein said insert supply comprises means for storing a stack of inserts; and means for withdrawing successive inserts from said stack in timed relation with the movement of said insert conveyer belt means.

8. Apparatus for automatically inserting inserts into envelopes in accordance with claim 7 wherein said guide means comprises a guide rail for guiding a longitudinal edge of an insert as said insert is transported into said inserting zone by said insert conveyer belt means and until said insert is completely inserted into a corresponding envelope.

* * * * *